United States Patent
Jensen

(10) Patent No.: US 11,112,500 B2
(45) Date of Patent: Sep. 7, 2021

(54) ULTRASOUND IMAGING FLOW VECTOR VELOCITY ESTIMATION WITH DIRECTIONAL TRANSVERSE OSCILLATION

(71) Applicant: B-K Medical Aps, Herlev (DK)

(72) Inventor: Jorgen Arendt Jensen, Horsholm (DK)

(73) Assignee: BK Medical APS, Herlev (DK)

( * ) Notice: Subject to any disclaimer, the term of this patent is extended or adjusted under 35 U.S.C. 154(b) by 742 days.

(21) Appl. No.: 15/555,108

(22) PCT Filed: Mar. 2, 2015

(86) PCT No.: PCT/IB2015/051526
§ 371 (c)(1),
(2) Date: Sep. 1, 2017

(87) PCT Pub. No.: WO2016/139506
PCT Pub. Date: Sep. 9, 2016

(65) Prior Publication Data
US 2018/0038955 A1 Feb. 8, 2018

(51) Int. Cl.
*G01S 15/89* (2006.01)
*G01S 7/52* (2006.01)

(52) U.S. Cl.
CPC ...... *G01S 15/8984* (2013.01); *G01S 7/52095* (2013.01); *G01S 15/8925* (2013.01); *G01S 15/8997* (2013.01)

(58) Field of Classification Search
CPC .. G01S 15/89; G01S 15/8984; G01S 15/8925; G01S 7/52095; G01S 15/8997

(Continued)

(56) References Cited

U.S. PATENT DOCUMENTS

| 5,522,393 A | 6/1996 | Phillips et al. |
| 6,196,972 B1 * | 3/2001 | Moehring ............... A61B 8/06 600/441 |

(Continued)

OTHER PUBLICATIONS

Pihl ["A Transverse Oscillation Approach for Estimation of Three-Dimensional Velocity Vectors, Part I: Concept and Simulation Study" IEEE Transactions on Ultrasonics, Ferroelectrics, and Frequency Control, vol. 61, No. 10, Oct. 2014], (Year: 2014).*

(Continued)

*Primary Examiner* — Oommen Jacob
(74) *Attorney, Agent, or Firm* — Anthony M. Del Zoppo, III; Daugherty & Del Zoppo, Co. LPA

(57) ABSTRACT

An ultrasound imaging system (100) includes a transducer array (102) with plurality of transducer elements (200) configured to transmit an ultrasound signal and receive echoes. Transmit circuitry (104) is configured to excite the transducer elements to transmit the ultrasound signal along a propagation direction. Receive circuitry (106) is configured to receive an echo signal produced in response to the ultrasound signal traversing flowing structure in the field of view. A beamformer (112) is configured to beamform the echo signal and produce a single directional signal at a depth. The directional signal is transverse to the propagation direction of the ultrasound signal. A velocity processor (114) is configured to transform the directional signal to produce a corresponding quadrature signal, estimate a depth velocity component and a transverse velocity component at the depth based on the directional signal and the quadrature signal, and generate a signal indicative of the estimate.

20 Claims, 6 Drawing Sheets

(58) Field of Classification Search
USPC .................................................. 600/437, 407
See application file for complete search history.

(56) References Cited

U.S. PATENT DOCUMENTS

| | | | | |
|---|---|---|---|---|
| 8,439,840 | B1* | 5/2013 | Duffy ................... | A61B 8/4488 600/443 |
| 2009/0069693 | A1* | 3/2009 | Burcher ............. | G01S 15/8995 600/459 |
| 2014/0257103 | A1* | 9/2014 | Jensen ................... | G01P 5/244 600/441 |
| 2018/0038955 | A1* | 2/2018 | Jensen ................ | G01S 15/8984 |
| 2020/0138401 | A1* | 5/2020 | Haugaard ........... | G01S 15/8984 |

OTHER PUBLICATIONS

Udesen [Udesen ["Investigation of Transverse Oscillation Method", IEEE Transactions On Ultrasonics, Ferroelectrics, and Frequency Control, vol. 53, No. 5, May 2006], (Year: 2006).*

Liegbott ["Lateral RF Image Synthesis Using a Synthetic Aperture Imaging Technique" IEEE Transactions on Ultrasonics, Ferroelectrics, and Frequency Control, vol. 55, No. 9, Sep. 2008], (Year: 2008).*

Varray ["An Alternative Method To Classical Beamforming for Transverse Oscillation Images: Application To Elastography", 2013 IEEE 10th International Symposium on Biomedical Imaging:] (Year: 2013).*

Gueth ["Beamforming Techniques for Motion Estimation in Ultrasound Elastography" 2007 IEEE Ultrasonics Symposium] (Year: 2007).*

International Search Report for PCT/IB2015/051526 published as WO2016/139506 A1 dated Sep. 9, 2016.

Jesper Udesen and Jorgen Arendt Jensen, Investigation of Transverse Oscillation Method, IEEE Trans on Ultrasonics, vol. 53, No. 5, May 2006.

Michael Johannes Pifil and Jorgen Arendt Jensen, A Transverse Oscillation Approach for Estimation of Three-Dimensional Velocity Vectors, Part I: Concept and Simulation Study, IEEE Trans on Ultrasonics, vol. 61, No. 10, Oct. 2014.

Jorgen Arendt Jensen et al., Vector Blood velocity estimation in medical ultrasound, 5th International Symposium on Ultrasonic Doppler Methods for Fluid Mechanics and Fluid Engineering, 2006.

Jorgen Arendt Jensen, Transverse Spectral Velocity Estimation, IEEE Trans on Ultrasonics, vol. 61, No. 11, Nov. 2014.

Jorgen Arendt Jensen, et al., Recent Advances in Blood Flow Vector Velocity Imaging, 2011 IEEE International Ultrasonics Symposium Proceedings. 2011.

* cited by examiner

ULTRASOUND IMAGING FLOW VECTOR VELOCITY ESTIMATION WITH DIRECTIONAL TRANSVERSE OSCILLATION

RELATED APPLICATION

This application is a national filing of PCT application Serial No. PCT/IB2015/051526, filed Mar. 2, 2015, published as WO2016/139506 on Sep. 9, 2016. This application claims priority to PCT application Serial No. PCT/IB2015/051526, published as WO2016/139506 on Sep. 9, 2016.

TECHNICAL FIELD

The following generally relates to ultrasound imaging and more particularly to estimating a velocity vector for flowing structures using a directional transverse oscillation (TO) approach.

BACKGROUND

Ultrasound imaging provides useful information about the interior characteristics of an object or subject such as a human or animal patient. For example, an ultrasound scanner has been used to estimate blood flow velocity and generate one or more images of a vessel with the estimated blood velocity superimposed there over. In the complex human hemodynamics, it is important to estimate both the velocity magnitude and the velocity direction. The velocity vector in a plane has been estimated using the transverse oscillation (TO) approach.

Examples of the TO approach are described in Jensen et al., "A New Method for Estimation of Velocity Vectors," *IEEE Trans. Ultrason., Ferroelec., Freq. Contr.*, 45:837-851, 1998, Jensen, "A New Estimator for Vector Velocity Estimation," *IEEE Trans. Ultrason., Ferroelec., Freq. Contr.*, 48(4):886-894, 2001, Jensen, "Estimator for Vector Velocity," U.S. Pat. No. 6,859,659 B1, and Jensen, "Apparatus and method for determining movements and velocities of moving objects," U.S. Pat. No. 6,148,224, filed Dec. 30, 1998, the entireties of which are incorporated herein by reference.

For TO vector flow imaging (VFI), two samples are beamformed during receive. The two samples have to be phased shifted a quarter of the lateral wavelength (ninety degrees). This wavelength depends on the emit focus, receive apodization, and the interrogation depth. The TO wavelength has been estimated from Equation 1:

$$\lambda_x = \frac{2\lambda D}{P_d} = \frac{2\lambda D}{N_d P_i},\qquad \text{Equation 1}$$

where $\lambda$ is the normal axial wavelength, D is the depth, $P_d$ is the distance between the two peaks in the apodization function, $P_i$ is the transducer pitch, and $N_d$ is the number of elements between the peaks.

The lateral wavelength depends on depth. As a consequence, the lateral wavelength has to be calculated for every depth to ensure an unbiased and accurate result. Furthermore, Equation 1 is also only valid in the far-field or at the focus. For a pulsed field this can introduce a significant bias, which requires optimization, which complicates the implementation of the approach. In view of at least the above, there is an unresolved need for another approach for estimating the velocity vector.

SUMMARY

Aspects of the application address the above matters, and others.

In one aspect, an ultrasound imaging system includes a transducer array with plurality of transducer elements configured to transmit an ultrasound signal and receive echoes. Transmit circuitry is configured to excite the transducer elements to transmit the ultrasound signal along a propagation direction. Receive circuitry is configured to receive an echo signal produced in response to the ultrasound signal traversing flowing structure in the field of view. A beamformer is configured to beamform the echo signal and produce a single directional signal at a depth. The directional signal is transverse to the propagation direction of the ultrasound signal. A velocity processor is configured to transform the directional signal to produce a corresponding quadrature signal, estimate a depth velocity component and a transverse velocity component at the depth based on the directional signal and the quadrature signal, and generate a signal indicative of the estimate.

In another aspect, a method includes receiving echo signals at a transducer array that produces receive signals indicative thereof. The method further includes beamforming the receive signals to produce a single transverse signal at each of a plurality of depths. The method further includes transforming, with a processor, the transverse signals for each of the plurality of depths into transformed signals at each of the plurality of depths. The method further includes estimating, with the processor, velocity components for a depth direction and a transverse direction at each of the depths with the transverse signals and the transformed signals.

In another aspect, a non-transitory computer readable storage medium is encoded with computer readable instructions. The computer readable instructions, when executed by a processor of a computing system, causes the processor to: generate a single transverse signal from an echo signal, wherein the single transverse signal is transverse to a direction of a propagating ultrasound signal, generate a quadrature signal from the single transverse signal, and estimate a velocity component from the single transverse signal and the quadrature signal.

Those skilled in the art will recognize still other aspects of the present application upon reading and understanding the attached description.

BRIEF DESCRIPTION OF THE DRAWINGS

The application is illustrated by way of example and not limited by the figures of the accompanying drawings, in which like references indicate similar elements and in which.

DETAILED DESCRIPTION

The following describes vector velocity estimation using a directional TO approach. One embodiment includes beamforming a single line (for each of a plurality of interrogation depths of interest) that is transverse to the propagation direction of the emitted ultrasound beam and estimating a velocity vector from this line and its Hilbert transform. This makes the approach self-calibrating and can increase an accuracy of TO estimates for the velocity components, the magnitude and phase, be used to increase spectral accuracy in transverse spectral velocity estimation. and/or determine an angle for directional beamforming. The latter can give a significant processing gain for directional beamforming, as the data does not have to be beamformed in many directions to find the proper flow angle, but only in a few directions. This can typically give a reduction in processing by a factor of 10 to 20 times and still maintain the accuracy of directional beamforming.

Figure 1:
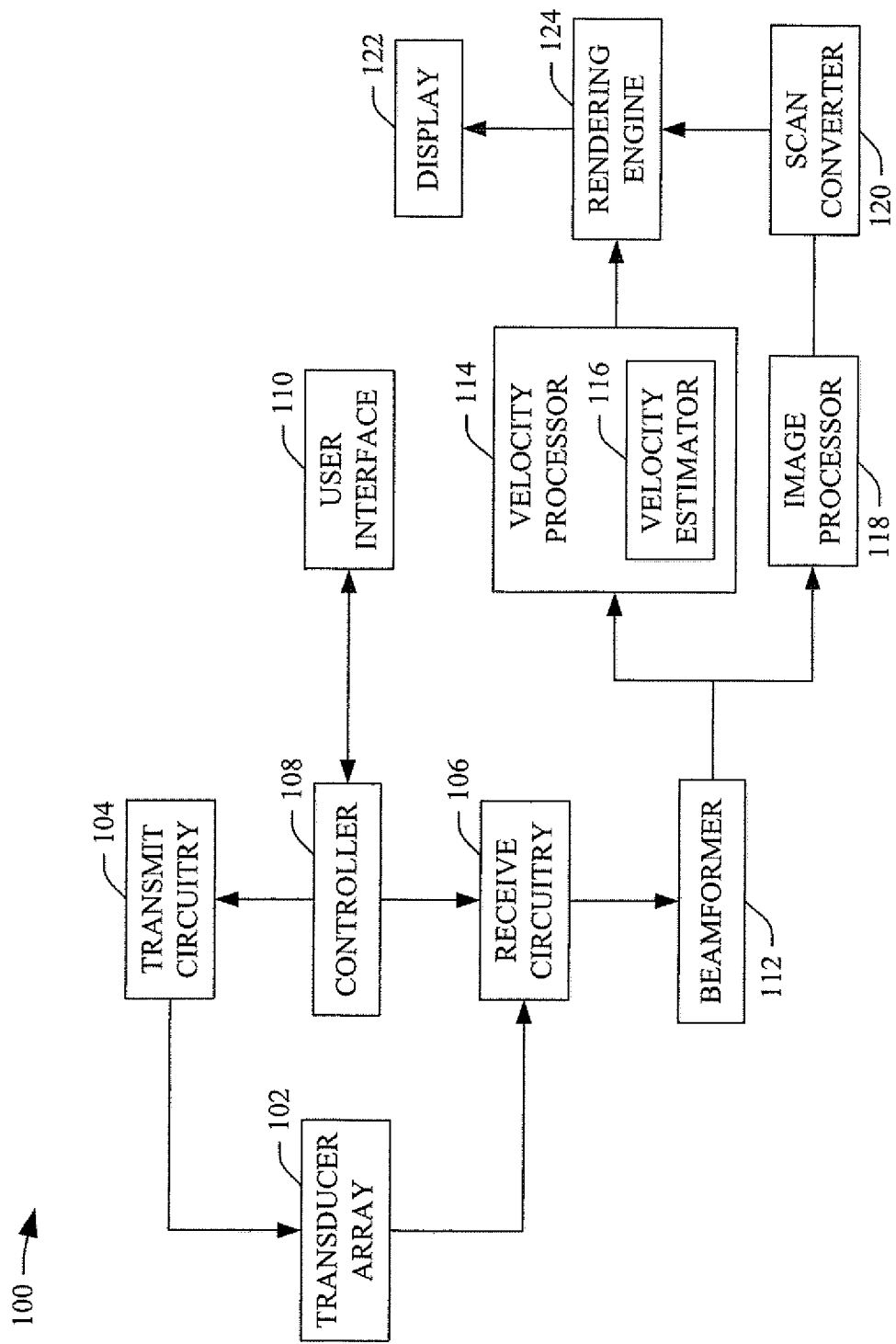
FIG. 1 schematically illustrates an ultrasound imaging system with a velocity processor.

Initially referring to FIG. 1, an example ultrasound imaging system 100 is illustrated. A transducer array 102 includes a plurality of transducer elements (not visible in FIG. 1; visible in FIG. 2), which are configured to transmit ultrasound signals and receive echo signals. Examples of suitable one-dimensional (1-D) arrays include arrays with 8, 16, 32, 64, 96, 128, 512, etc. transducer elements. Other numbers of elements and/or dimensions (e.g., two-dimensional, or 2-D) are also contemplated herein. The array 102 can be linear, curved, and/or otherwise shaped. The transducer array 102 can be fully populated or sparse and/or a combination thereof.

Transmit circuitry 104 generates a set of pulses that are conveyed to the transducer array 102. The set of pulses actuates a corresponding set of the transducer elements of the transducer array 102, causing the elements to transmit ultrasound signals into an examination or scan field of view. Receive circuitry 106 receives echoes generated in response to the transmitted ultrasound signals from the transducer 102. The echoes, generally, are a result of the interaction between the emitted ultrasound signals and the structure (e.g., flowing blood cells, organ cells, etc.) in the scan field of view.

A controller 108 controls the transmit circuitry 104 and/or receive circuitry 106. Such control can be based on a current mode of operation (e.g., velocity flow, B-mode, etc.). Such control includes controlling the transmit circuitry 104 and the receive circuitry 106 to acquire data suitable for vector velocity estimation using directional TO. A non-limiting example of such control is provided below in connection with FIG. 2. The control can be through a user interface (UI) 110 via a user actuating a control thereof and/or software. The UI 110 may include an input device (e.g., a button, a slider, a touch surface, etc.) and/or an output device (e.g., a visual and/or audible, etc.).

A beamformer 112 processes the echoes, e.g., by applying time delays and/or weights on data from transducer elements and summing the time delayed and/or weighted data, and/or otherwise beamforming received echoes. In one instance, such processing generates data (e.g., a directional signal) at least for estimating vector velocity components. As described in greater detail below, this includes beamforming a single line for each depth of interest, where each line is transverse to the direction of propagation of the emitted ultrasound signal. For the directional TO approach described herein, the beamformer 112 does not beamform two (or a pair of) samples for a depth, where the samples of a pair are phased shifted a quarter of the lateral wavelength. The illustrated beamformer 112 also produces data for generating images in A-mode, B-mode, etc.

A velocity processor 114 includes a velocity estimator 116 that is configured to process the beamformed data and determine velocity components of flowing structure. This includes processing the beamformed data to determine a velocity component in the depth direction and/or in a direction transverse to the depth direction. As described in greater detail below, the velocity estimator 116 estimates vector velocities based on a directional TO approach. For this approach, the velocity processor 114 transforms the directional signal via a Hilbert transform, and estimates the velocity vector based on the directional signal and its Hilbert transform. Generally, this approach combines a TO approach and a directional beam forming approach. This approach does not require a spatial quadrature between beamformed signals, rendering the approach self-calibrating and improving the accuracy of vector velocity estimation relative to TO VFI.

An image processor 118 also processes the beamformed data. For B-mode, the image processor 118 processes the signals from the beamformer 112 and generates a sequence of focused, coherent echo samples along focused scanlines of a scanplane. The image processor 118 may also be configured to process the scanlines to lower speckle and/or improve specular reflector delineation via spatial compounding and/or perform other processing such as FIR filtering, IIR filtering, etc.

A scan converter 120 converts the scanlines to data suitable for display by converting the data to the coordinate system of a display 122. A rendering engine 124 visually presents the data as an image and/or velocity information via the display 122. Such presentation can be in an interactive graphical user interface (GUI), which allows the user to selectively rotate, scale, and/or manipulate the displayed data. Such interaction can be through a mouse or the like, and/or a keyboard or the like, touch-screen controls and/or the like, and/or other known and/or approach for interacting with the GUI.

It is to be appreciated that the beamformer 112, the velocity processor 114, the velocity estimator 116, and/or other components of the system 100 can be implemented via a processor (e.g., a microprocessor, central processing unit, etc.) executing one or more computer readable instructions encoded or embedded on a non-transitory computer readable storage medium such as physical memory. The processor can additionally or alternatively execute a computer readable instruction carried by a carrier wave, a signal, or other transitory medium.

Figure 2:
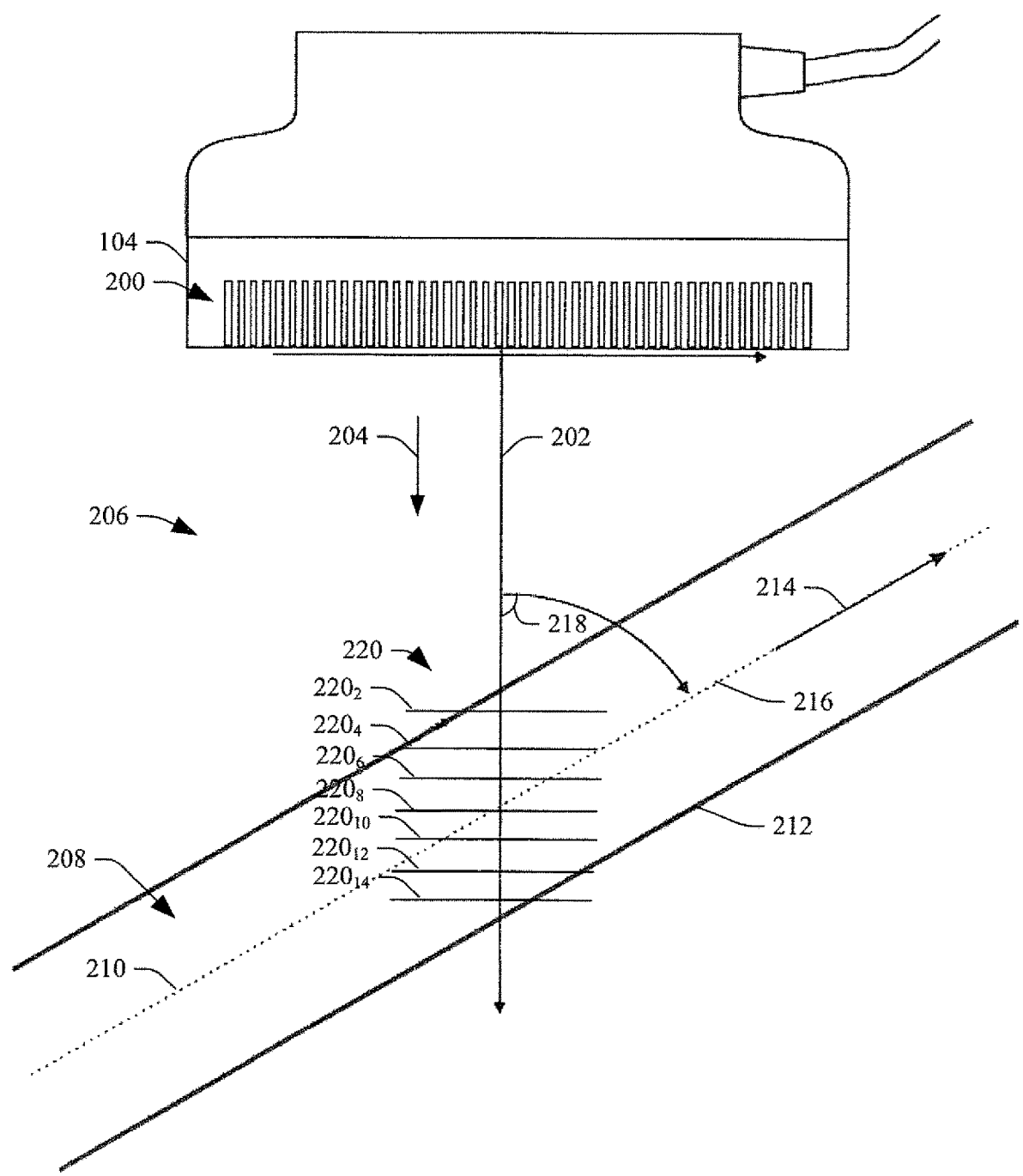
FIG. 2 illustrates beamformed directional signals, which are transverse to the propagation direction of the emitted US signal.

FIG. 2 show example operation of the system 100 in connection with estimating a velocity vector with a directional TO approach.

Figure 3:
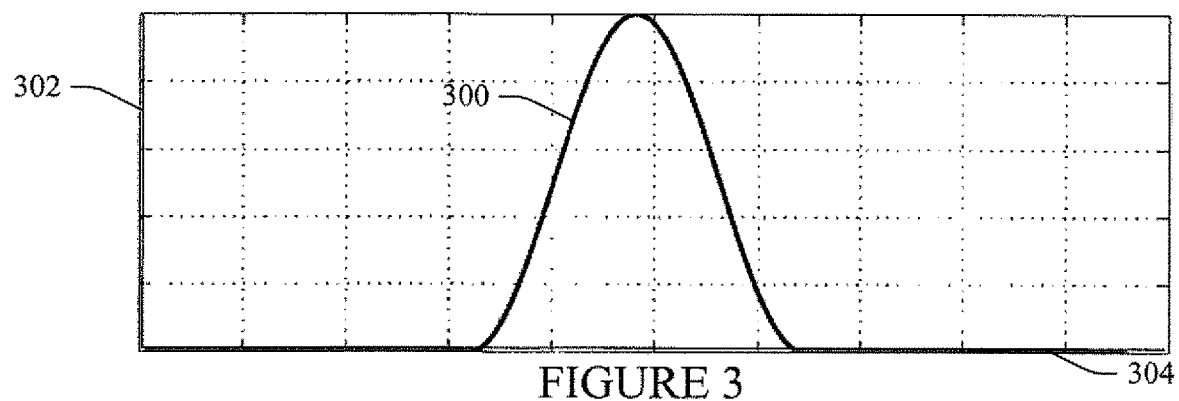
FIG. 3 illustrates an example transmit apodization profile.

In FIG. 2, transducer elements 200 of the transducer array 102 are excited to transmit an ultrasound signal 202 that traverses along a propagation direction 204. In this example, the ultrasound signal 202 traverses an examination region 206 and blood cells 208 moving along a long axis 210 of a sub-portion of a blood vessel 212 in the examination region 206. The blood cells 208 move in a direction 214 within the vessel 212 at a velocity. A centerline 216 of the vessel 212 is at an angle 218 with respect to the propagation direction 204. In this example, a normal focused field is emitted. FIG. 3 shows an example transmit apodization profile 300, where a first axis 302 represents apodization value, and a second axis 304 represents transducer element number.

Figure 4:
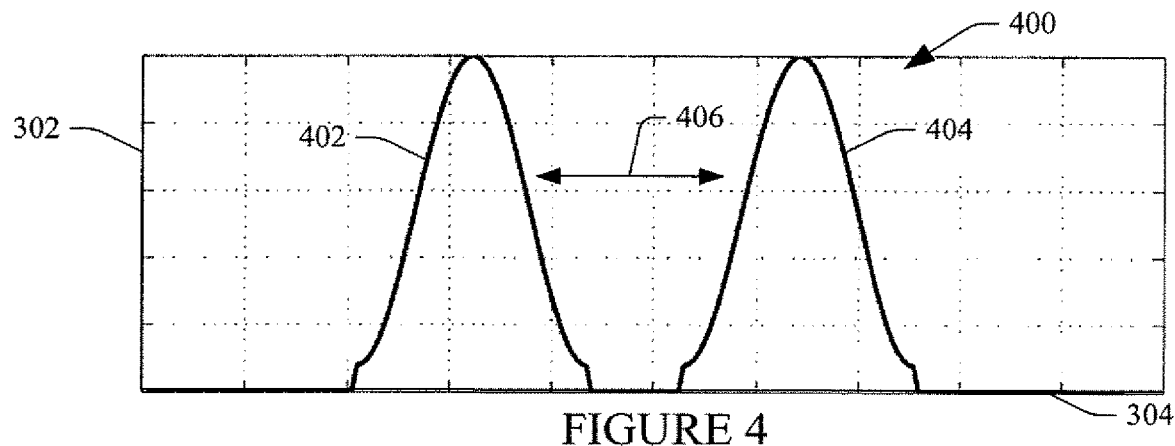
FIG. 4 illustrates an example receive apodization profile.

With reference to FIGS. 1 and 2, echo signals are received by the transducer elements 200 of the transducer array 104. For receive, a lateral oscillation is introduced, and focus is not along the flow direction 214. A lateral oscillation can be obtained using a suitable receive apodization waveform. Briefly turning to FIG. 4, an example receive apodization profile 400 is illustrated. The example receive apodization profile 400 includes two peaks 402 and 404, which are separated by a non-zero distance 406. Similar to FIG. 3, in FIG. 4 the first axis 302 represents an apodization value and the second axis 304 represents the transducer element number. Two peaks in the apodization can also be employed for the transmit beam to generate a lateral oscillation with a shorter wavelength.

Figure 5:
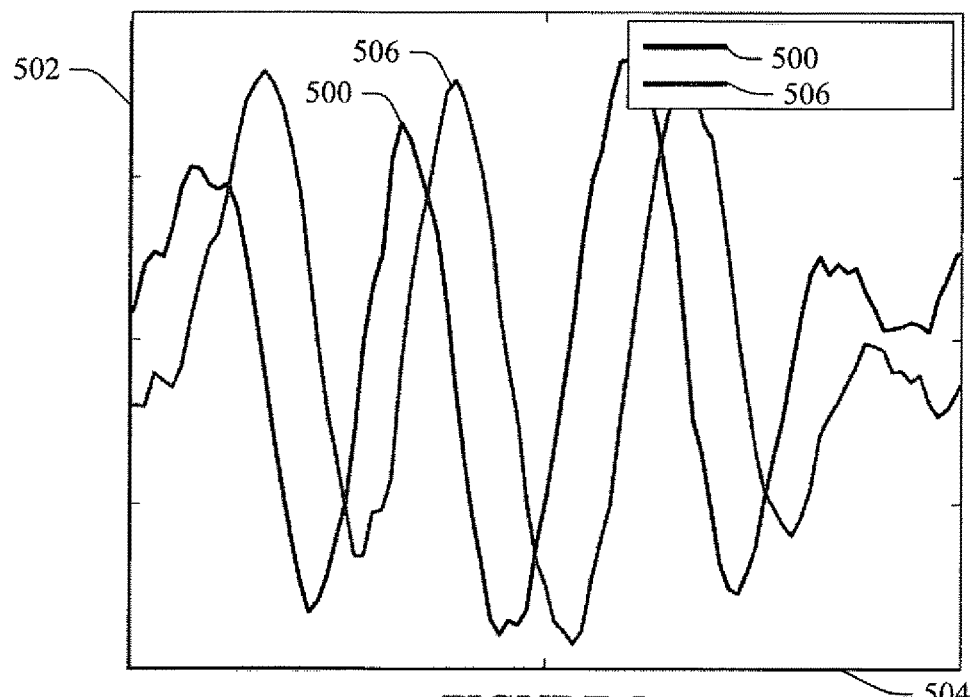
FIG. 5 shows a plot of a beamformed directional signal and a plot of beamformed directional signal after application of a Hilbert transform thereto.

With continuing reference to FIGS. 1 and 2, the beamformer 112 beamforms the receive signal output by the receive circuitry 106 and generates a single directional signal (or line of data) 220 therefrom for each depth of interest, where the single directional signal is transverse to the propagation direction 204. For this, the beamformer 112 focuses each beam x(n) at a depth of interest in the lateral direction, and a directional signal ($220_2$-$220_{14}$ in the illustrated example) as a function of lateral distance is determined for each depth along the propagation direction 204. An example of such a signal 500 is shown in FIG. 5, where a first axis 502 represents a signal value and a second axis 504 represents a transverse distance.

With continuing reference to FIGS. 1 and 2, the velocity estimator 116 generates a complex signal $r_{sq}$ from the directional signal with Equation 2:

$$r_{sq}(n,i) = x(n,i) + jy(n,i), \quad \text{Equation 2:}$$

where n is the signal, i is the emission number, x(n; i) is the real part of the complex signal, and jy(n, i) is the imaginary part of the complex signal. The velocity estimator 116 generates a new directional beamformed signal $r_{sqh}$ at the same depth by transforming $r_{sq}$ with a Hilbert transform: y(n)=H{x(n)}. This produces a quadrature signal over all frequencies. An example of a Hilbert transformed signal 506 is also shown in FIG. 5. This yields a signal with a one-sided spectrum, which can be directly used by the velocity estimator 116.

With continuing reference to FIGS. 1 and 2, the velocity estimator 116 generates two new signals from the two complex signals $r_{sq}$ and $r_{sqh}$ using Equation 3:

$$r_1(n,i) = r_{sq}(n,i) + jr_{sqh}(n,i), \text{ and}$$

$$r_2(n,i) = r_{sq}(n,i) - jr_{sqh}(n,i). \quad \text{Equation 3:}$$

The changes in phase as a function of emission number for the two signals can be determined as shown in Equation 4:

$$d\Theta_1 = 2\pi T_{prf}(f_x + f_p), \text{ and}$$

$$d\Theta_2 = 2\pi T_{prf}(f_x - f_p). \quad \text{Equation 4:}$$

where $T_{prf}$ is the pulse repetition time, $f_p$ is the received axial frequency, and $f_x$ is the lateral frequency. The two phase changes are added to produce Equation 5:

$$d\Theta_1 + d\Theta_2 = 2\pi 2 T_{prf} f_x = 4\pi T_{prf} \frac{v_x}{d_x}, \quad \text{Equation 5}$$

where $v_x$ is the transverse velocity component, and subtracted to produce Equation 6:

$$d\Theta_1 - d\Theta_2 = 2\pi 2 T_{prf} f_p = 4\pi T_{prf} \frac{2v_z}{c} f_0, \quad \text{Equation 6}$$

where $f_0$ is the emitted frequency, c is the speed of sound, and $v_z$ is the axial velocity component. The transverse velocity can be determined from Equation 7:

$$v_x = \frac{(d\Theta_1 + d\Theta_2)d_x}{2\pi 2 T_{prf}}, \quad \text{Equation 7}$$

and the axial velocity can be determined from Equation 8:

$$v_z = \frac{(d\Theta_1 - d\Theta_2)c}{2\pi 4 T_{prf} f_0}. \quad \text{Equation 8}$$

For the complex signal shown in Equation 9:

$$r(i) = x(i) + jy(i), \quad \text{Equation 9:}$$

the phase change can be determined with Equation 10:

$$d\hat{\Theta}_1 = \arctan\left(\frac{\sum_{i=0}^{N-1} y(i)x(i-1) - y(i-1)x(i)}{\sum_{i=0}^{N-1} x(i)x(i-1) + y(i)y(i-1)}\right), \quad \text{Equation 10}$$

which can also be represented as shown in Equation 11:

$$d\hat{\Theta}_1 = \arctan\left(\frac{\Im\{R(1)\}}{\Re\{R(1)\}}\right), \quad \text{Equation 11}$$

where $\Im\{R(1)\}$ denotes the imaginary part of the complex autocorrelation, and $\Re\{R(1)\}$ denotes the real part both at a lag of one (1). This can be achieved using the estimated complex autocorrelation of the signal shown in Equation 12:

$$\hat{R}(m) = \frac{1}{N-m} \sum_{i=0}^{N-M} r^*(i)r(i+m), \quad \text{Equation 12}$$

where m is the lag in the autocorrelation function. For the directional signals, the autocorrelation function estimates can be represented as shown in Equations 13 and 14:

$$\hat{R}_1(1) = \frac{1}{NN_s}\sum_{i=0}^{N-1}\sum_{n=0}^{N_s} r_1^*(n, i)r_1(n, i+1),$$  Equation 13 and $$\hat{R}_2(1) = \frac{1}{NN_s}\sum_{i=0}^{N-2}\sum_{n=0}^{N_s} r_2^*(n, i)r_2(n, i+1).$$  Equation 14

The autocorrelation estimates are averaged over the number of emissions N and the number of samples in the directional lines $N_S$. This reduces the noise and improves on the estimation accuracy.

The velocity estimators for the two velocity components can then be represented as shown in Equations 15 and 16:

$$v_x = \frac{d_x}{2\pi 2 T_{prf}} = \arctan\left(\frac{\Im\{R_1(1)\}\Re\{R_2(1)\} + \Im\{R_2(1)\}\Re\{R_1(1)\}}{\Re\{R_1(1)\}\Re\{R_2(1)\} - \Im\{R_1(1)\}\Im\{R_2(1)\}}\right),$$  Equation 15 and $$v_y = \frac{c}{2\pi 4 T_{prf} f_0} = \arctan\left(\frac{\Im\{R_1(1)\}\Re\{R_2(1)\} - \Im\{R_2(1)\}\Re\{R_1(1)\}}{\Re\{R_1(1)\}\Re\{R_2(1)\} + \Im\{R_1(1)\}\Im\{R_2(1)\}}\right).$$  Equation 16

The lateral wavelength can be calculated using Equation 1 or Equation 17:

$$\frac{1}{\lambda_x} = f_x = \frac{\int f G_i(f) df}{\int G_i(f) df},$$  Equation 17 where $G_i(f)$ is the Fourier transform of the complex directional signal $g(n, i) = x(n, i) + jy(n, i)$ along the sample direction n. An advantage of this is that the approach is self-calibrating. The lateral wavelength $\lambda_x$ can be calculated for the different depths, and the velocity estimator 116 automatically yields an unbiased estimate of the transfer velocity. This estimate can be improved by averaging the estimator over all emissions, e.g., using Equation 18:

$$f_x = \frac{1}{N}\sum_{i=0}^{N-1} \frac{\int f G_i(f) df}{\int G_i(f) df}.$$  Equation 18

The beamforming can be performed for a normal focused emission, synthetic aperture flow imaging, and/or plane wave imaging. The transmit and receive apodization function can be changed as a function of depth to obtain a highest possible $f_x$. In synthetic aperture and plane wave imaging, the combined transmit apodization function can also be manipulated to further increase the lateral oscillation frequency.

Figure 6:
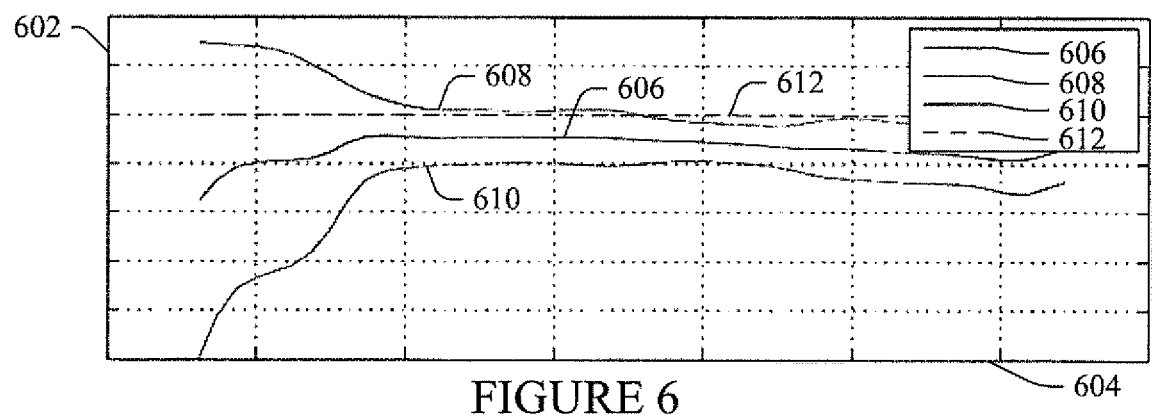
FIG. 6 shows velocity angles estimated using a prior art approach for a depth of three (3) centimeters.
Figure 7:
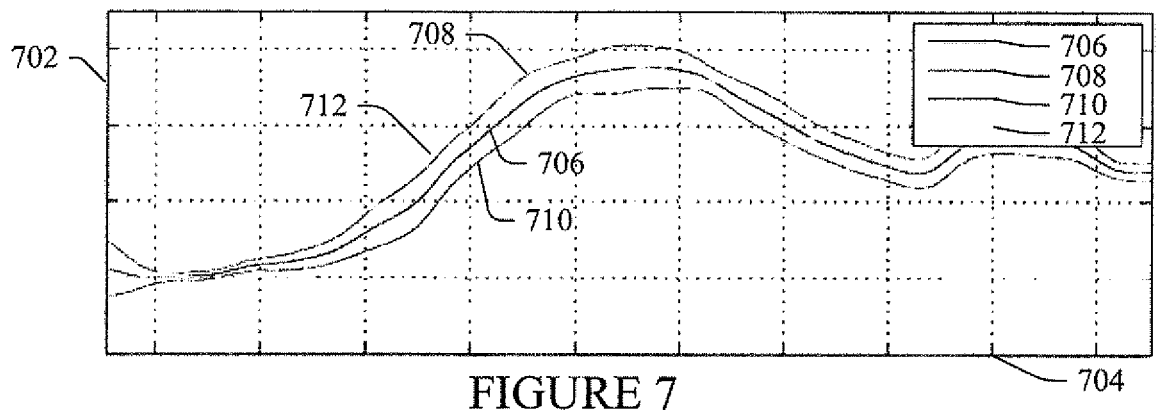
FIG. 7 shows mean velocities determined using a prior art approach for a depth of three (3) centimeters.
Figure 8:
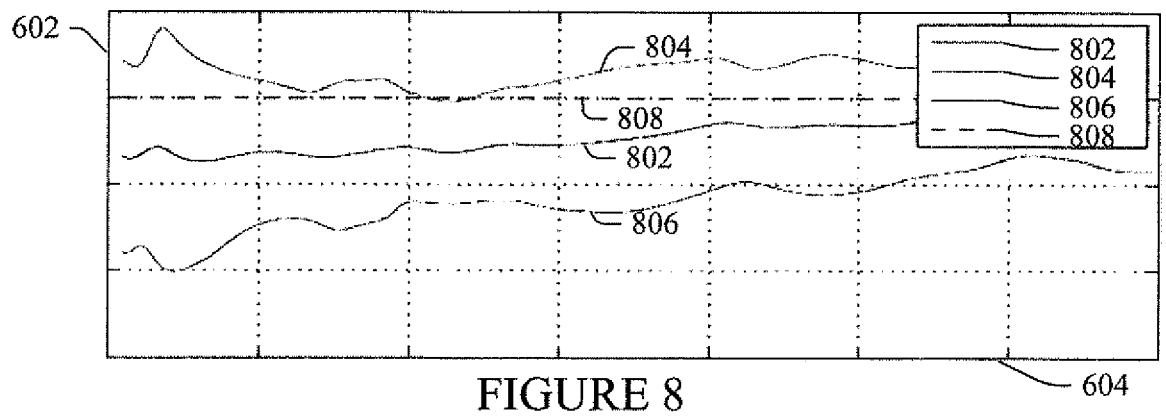
FIG. 8 shows velocity angles estimated using the approach described herein for a depth of three (3) centimeters.
Figure 9:
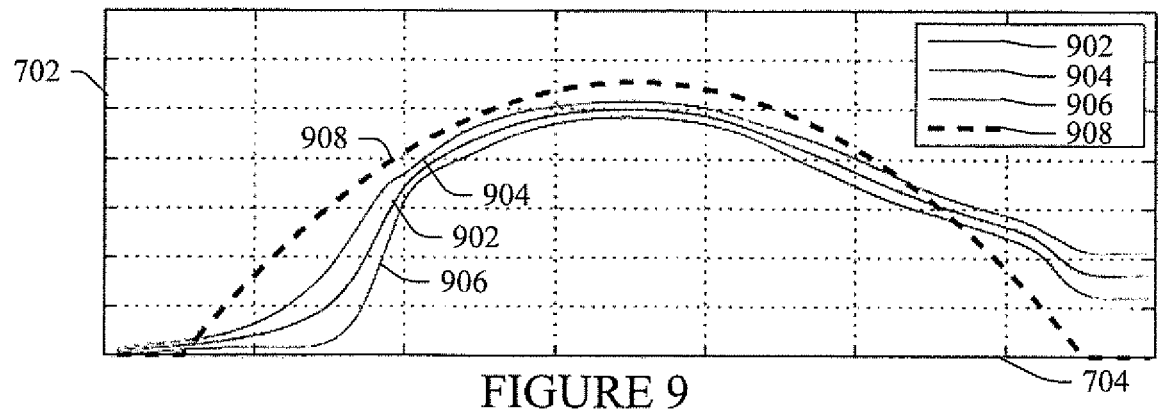
FIG. 9 shows mean velocities determined using the approach described herein for a depth of three (3) centimeters.

FIGS. 6 and 7 show an example of velocity estimation for a traditional approach. FIGS. 8 and 9 show an example of velocity estimation for the approach described herein. In FIGS. 6 and 8, a first or y-axis 602 represents estimated angle in units of degree and a second or x-axis 604 represents a depth in units of millimeters (mm). In FIGS. 7 and 9, a first or y-axis 702 represents velocity in units of meters per second (m/s) degree and a second or x-axis 704 represents a depth along the ultrasound direction in units of mm. With all of these figures, the vessel is three (3) cm from the transducer.

In FIGS. 6 and 8, curves 606 and 802 represents the mean angle, curves 608 and 804 represents the angle plus one standard deviation, curves 610 and 806 represents the angle minus one standard deviation, and curves 608 and 808 represents the true angle. In FIGS. 7 and 9, curves 706 and 902 represents the mean velocity, curves 708 and 904 represents the mean velocity plus one standard deviation, curves 710 and 906 represents the mean velocity minus one standard deviation, and curves 712 and 908 represents the true velocity. In the illustrated example, the relative standard deviation on the velocity estimates is smaller in FIG. 9 relative to the FIG. 7, dropping from 9.14% to 5.4%.

For the data in FIGS. 8 and 9, an active aperture of 64 elements was used during transmit for both sequences. The focal point was at 42 mm (F #=2) for B-mode and 105.6 mm (F #=5) for VFI. The transducer included 192 elements with λ pitch and the B-mode image consisted of 129 lines. VFI was interleaved with the B-mode imaging emissions. A 6 mm radius tube in a circulating flow rig was scanned and the volume flow was also measured by a Danfoss Magnetic flow meter for reference. The volume flow was 112.7 l/h corresponding to a peak velocity in the vessel of 0.55 m/s. The pulse repetition frequency was 4 kHz. The directional TO approach described herein is not limited to this configuration.

Figure 10:
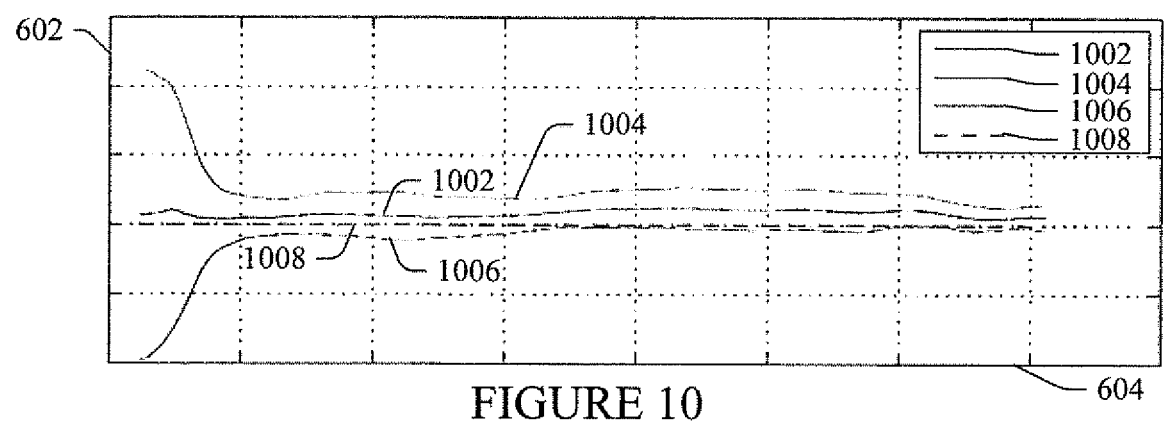
FIG. 10 shows velocity angles estimated using the approach described herein for a depth of seven (7) centimeters.
Figure 11:
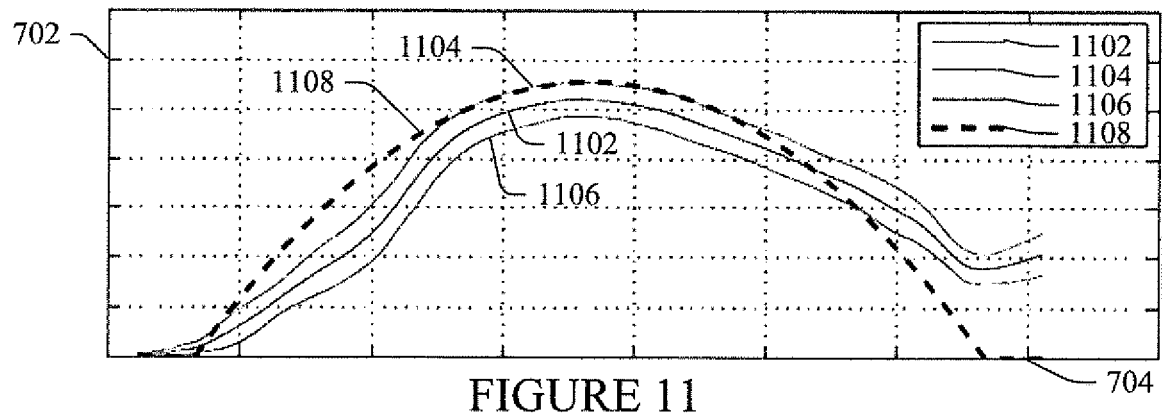
FIG. 11 shows mean velocities determined using the approach described herein for a depth of seven (7) centimeters.

FIGS. 8, 9, 10 and 11 show the self-calibrating feature of the approach described herein. With FIGS. 8 and 9, the vessel is three (3) cm from the transducer, and with FIGS. 10 and 11, the vessel is seven (7) cm from the transducer. The same beamforming scheme used for FIGS. 8 and 9 is used with FIGS. 10 and 11. In FIG. 10, a curve 1002 represents the mean angle, a curve 1004 represents the angle plus one standard deviation, a curve 1006 represents the angle minus one standard deviation, and a curve 1008 represents the true angle. In FIG. 11, a curve 1102 represents the mean velocity, a curve 1104 represents the mean velocity plus one standard deviation, a curve 1106 represents the mean velocity minus one standard deviation, and a curve 1108 represents the true velocity. In FIG. 8, the angle is found within ±3.93 degrees, and in FIG. 10, the angle is found within ±2.64 degrees. In FIG. 9, the relative standard deviation is 5.89%, and in FIG. 11, the relative standard deviation ±6.99%.

Variations are discussed next.

The above can additionally or alternatively be employed for transverse spectral estimation, which may provide for better estimates. The approaches discussed in Jensen et al., "Transverse spectral velocity estimation," *IEEE Trans. Ultrason., Ferroelec., Freq. Contr.*, page 1815-1823, Vol. 61, No. 11, 2014, and International (PCT) application serial number PCT/IB2012/002527, entitled "Angle independent velocity spectrum determination," and filed Nov. 28, 2012 (the entirety of which is incorporated herein by reference) can be used by the velocity processor 114 to determine a velocity spectrum in the transverse direction.

The velocity processor 114 can determine a fourth order estimate with Equation 17:

$$R_{44}(k) = R_{11}(k) \cdot R_{22}(k),$$  Equation 17:

where $R_{11}(k)$ and $R_{22}(k)$ are respective autocorrelations with $$R_{11}(k) = \frac{1}{NN_s} \sum_{i=0}^{N-1} \sum_{n=0}^{N_s} r_1(n, i) r_1^*(n, i+1)$$

and $$R_{22}(k) = \frac{1}{NN_s} \sum_{i=0}^{N-1} \sum_{n=0}^{N_s} r_2(n, i) r_2^*(n, i+1).$$

The velocity processor 114 can determine a power density spectrum with Equation 18:

$$P_{44}(f) = \sum_{k=-\infty}^{+\infty} R_{44}(k) \exp(-j2\pi f k).$$  Equation 18

The correlation estimates can be improved by utilizing RF averaging over the pulse lengths. An example of this is described in Jensen et al., "A New Method for Estimation of Velocity Vectors," *IEEE Trans. Ultrason., Ferroelec., Freq. Contr.*, 45:837-851, 1998 and Loupas et al., "An axial velocity estimator for ultrasound blood flow imaging, based on a full evaluation of the Doppler equation by means of a two-dimensional autocorrelation approach," *IEEE Trans. Ultrason., Ferroelec., Freq. Contr.*, 42:672-688, 1995. Edge effects can be reduced by weighting the data with, e.g., a Hanning window, and the resulting correlation functions can also be weighted by a Hanning window before calculation of the power density, e.g., using a fast Fourier transform.

In another variation, the beamforming is along the flow direction instead of the traverse direction. This, in one instance, improves the velocity estimates. For this, the beamformer 112 beamforms in the direction transverse to the ultrasound direction as described herein. From this, the velocity processor 114 can determine a velocity angle, e.g., with Equation 19:

$$\Theta = \arctan(v_x, v_z),$$  Equation 19:

using estimated velocities. The beamformer 112 uses this to beamform a second signal along the flow direction 214 with a normal apodization function, a TO apodization function, and/or other apodization function.

The velocity estimates can be determined as described in Jensen, "*Estimation of Blood Velocities Using Ultrasound: A Signal Processing Approach*," Cambridge University Press, New York, 199. The second beamforming can be as described in Jensen, "Optimization of transverse oscillating fields for vector velocity estimation with convex arrays," In *Proc. IEEE Ultrason. Symp.*, pages 1753-1756, July 2013, Jensen et al., "Directional synthetic aperture flow imaging," *IEEE Trans. Ultrason., Ferroelec., Freq. Contr.*, 51:1107-1118, 2004, Jensen, "Directional velocity estimation using focusing along the flow direction: I: Theory and simulation," *IEEE Trans. Ultrason., Ferroelec., Freq. Contr.*, 50:857-872, 2003, and/or U.S. Pat. No. 6,725,076 B1, entitled "Vector velocity estimation using directional beamforming and cross-correlation, and filed May 10, 1999, the entirety of which is incorporated herein by reference.

The velocity processor 114 can use these signals with a directional cross-correlation estimator to find the true velocity. The focusing points can be represented as shown in Equation 20:

$$\vec{r}_p(k) = [k\Delta x' \sin(\Theta) + x_{sr}, 0, k\Delta x' \cos(\Theta) + z_{sr}],$$  Equation 20:

where $\Delta x'$ is the spatial sampling interval, k is the sample index, $\Theta$ is the angle between the flow vector and the z-axis, and $(x_{sr}; 0; z_{sr})$ is the point in the image for velocity estimation. Beamforming for the values $\vec{r}_p(k)$ gives one directionally focused signal $y_d(k)$ for the given depth. The displacement $\vec{d}_s$ of the scatterers for the next directional line can be determined using Equation 21:

$$\vec{d}_s = \vec{v} T_{prf},$$  Equation 21:

where $\vec{v} = |\vec{v}|[\sin(\Theta), 0, \cos(\Theta)]$ corresponding to a sample index, which can be represented as shown in Equation 22:

$$k_s = \frac{|\vec{v}| T_{prf}}{\Delta x}.$$  Equation 22

Cross-correlating two received signals render Equation 23

$$R_{12}(l) = \frac{1}{N_k + 1} \sum_{k=-N_k/2}^{N_k/2} y_d^{(n)}(k) y_d^{(n+1)}(k+l) =$$  Equation 23

$$\frac{1}{N_k + 1} \sum_{k=-N_k/2}^{N_k/2} y_d^{(n)}(k) y_d^{(n)}(k+l-k_s) = R_{11}(l-k_s),$$

where $y_d^{(n)}(k)$ is the directional signal focused after emission n and $R_{11}(l)$ is the autocorrelation function of the directional signal. The global maximum at $l = k_s$ determines the velocity magnitude using Equation 24:

$$|\vec{v}| = \frac{k_s \Delta x}{T_{prf}}.$$  Equation 24

The velocity estimates precision can be enhanced by making an interpolation around the maximum point by employing Equation 25:

$$k_{int} = k_s - \frac{\hat{R}_{12}(k_s+1) - \hat{R}_{12}(k_s-1)}{2(\hat{R}_{12}(k_s+1) - 2\hat{R}_{12}(k_s) + \hat{R}_{12}(k_s-1))}$$  Equation 25 and the velocity processor 114 can the determine the velocity using Equation 26:

$$|\vec{v}| = \frac{k_{int} \Delta x}{T_{prf}}.$$  Equation 26

The angle estimation can potentially also be improved by beamforming three directional signals around the estimated angle. Example approaches are described in Kortbek et al., "Estimation of velocity vector angles using the directional cross-correlation method," *IEEE Trans. Ultrason., Ferroelec., Freq. Contr.*, 53:2036-2049, 2006, and Jensen et al., "Estimation of velocity vectors in synthetic aperture ultrasound imaging," *IEEE Trans. Ultrason., Ferroelec., Freq. Contr.*, 25:1637-1644, 2006.

The velocity processor 114 can improve the angle estimation based on Equation 27:

$$R_{12_n}(l, \Theta) = \frac{R_{12}(l, \Theta)}{R_{12}(0, \Theta)},\quad \text{Equation 27}$$

$$R_{12_{max}}(\Theta) = \max(R_{12}(l, \Theta)),$$

$$\hat{\theta}_k = \mathrm{argmax}(R_{12_{max}}(\Theta)),$$

where $R_{12_n}(l, \Theta)$ is the normalized cross-correlation estimate between directional signals, and $R_{11}(0, \Theta)$ is the corresponding power of the signal. $\Theta$ denotes the angle of the directional signal. $R_{12_{max}}(\Theta)$ is the maximum value of the normalized cross-correlation estimate as a function of beam-angle. The angle estimate, $\hat{\theta}_k$, is found where $R_{12_{max}}(\Theta)$ has its peak value.

Beamforming three directional signals before, at, and after the angle found by Equation 19 and calculating the corresponding values of $R_{12_n}(l, \Theta)$ gives a function with three values. This can be inserted into the interpolation of Equation 25 to yield an improved angle estimate. Beamforming directional lines for this angle and using Equation 23 gives an improved velocity estimate.

In another variation, the approach described herein is employed for three-dimensional velocity estimation. For this, a two-dimensional transducer is employed, and the beamformer 112 beamforms in two orthogonal planes, generating five lines in parallel. These lines can be processed to determine the velocity estimates for all three velocity component $v_x$, $v_y$ and $v_z$. The in-phase and quadrature beamforming is replaced by a transverse beamforming orthogonal to the ultrasound beam direction in the x-z plane and in the y-z plane. The estimation scheme described herein can then be employed.

Examples of TO vector velocity estimation for 3-D imaging are described Pihl et al., "A transverse oscillation approach for estimation of three-dimensional velocity vectors. Part I: Concept and simulation study," *IEEE Trans. Ultrason., Ferroelec., Freq. Contr.*, 61:1599-1607, 2014, and Pihl et al. "A transverse oscillation approach for estimation of three-dimensional velocity vectors. Part II: Experimental validation," *IEEE Trans. Ultrason., Ferroelec., Freq. Contr.*, page 1608-1618, Vol. 61, No. 10, 2014.

Figure 12:
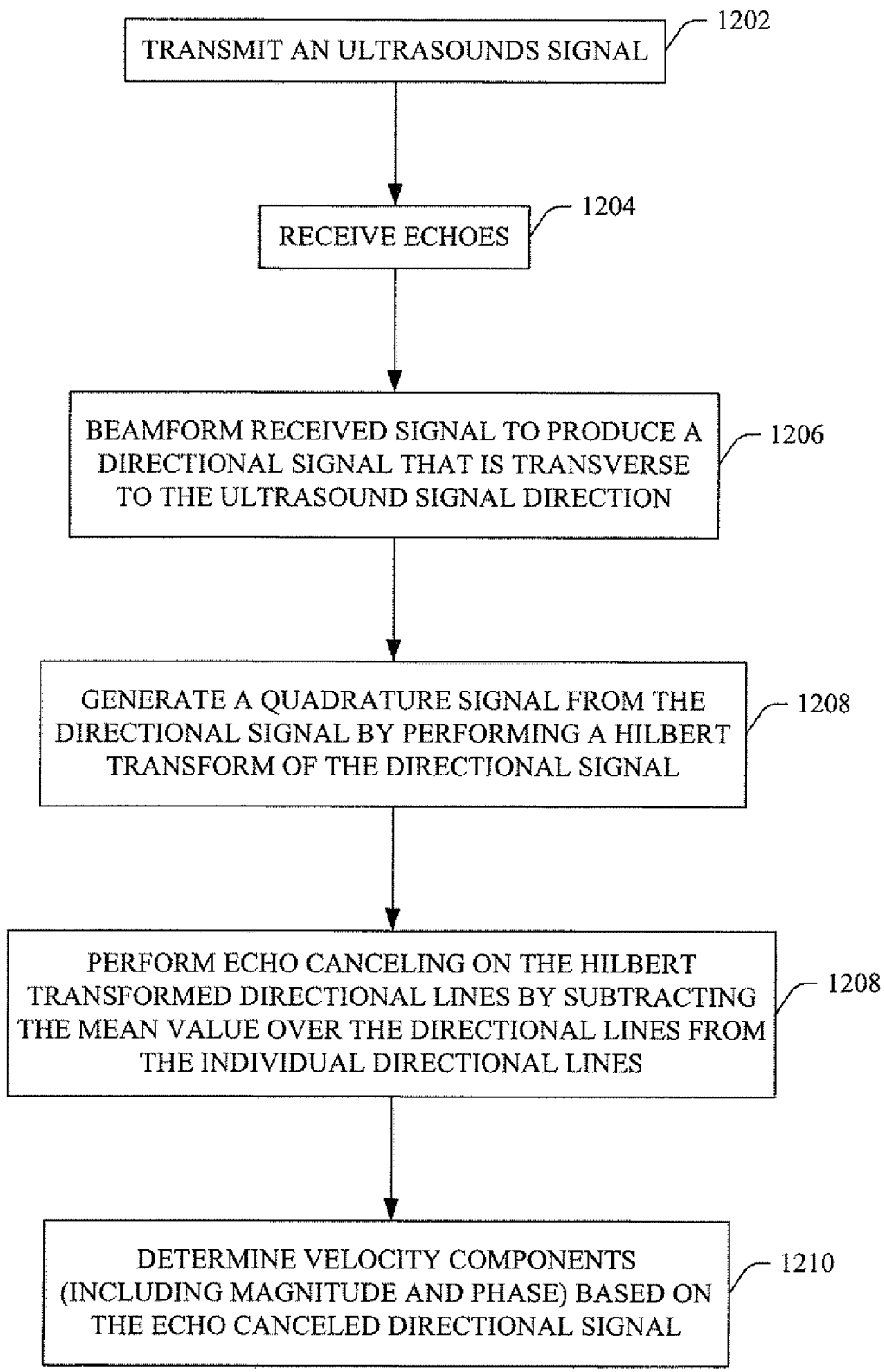
FIG. 12 illustrates a method for estimating a velocity vector for flowing structure using a directional TO approach.

FIG. 12 illustrates a method for estimating a velocity vector for flowing structure using a directional TO approach.

It is to be understood that the following acts are provided for explanatory purposes and are not limiting. As such, one or more of the acts may be omitted, one or more acts may be added, one or more acts may occur in a different order (including simultaneously with another act), etc.

At 1202, an ultrasound signal is transmitted via a transducer array and traverses in a propagation direction.

At 1204, echo signals, generated in response to the emitted ultrasound signal interacting with matter, are received by a transducer array.

At 1206, the echo signals are beamformed to generate directional lines, at different depths along the propagation direction, which are transverse to the propagation direction.

At 1208, corresponding quadrature signals are generated by performing a Hilbert transform of the directional lines.

At 1210 an echo canceling is performed on the Hilbert transformed directional lines by subtracting the mean value over the directional lines from the individual directional lines.

At 1212, velocity components are determined based on the echo canceled directional lines.

The velocity components can be save to memory, conveyed to another device, visually displayed (e.g., numerically, graphically, etc.), superimposed over an image, and/or otherwise utilized.

The methods described herein may be implemented via one or more processors executing one or more computer readable instructions encoded or embodied on computer readable storage medium such as physical memory which causes the one or more processors to carry out the various acts and/or other functions and/or acts. Additionally or alternatively, the one or more processors can execute instructions carried by transitory medium such as a signal or carrier wave.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An ultrasound imaging system, comprising:
a transducer array including a plurality of transducer elements configured to transmit an ultrasound signal and receive echoes;
transmit circuitry configured to excite the transducer elements to transmit the ultrasound signal along a propagation direction;
receive circuitry configured to receive an echo signal produced in response to the ultrasound signal traversing flowing structure in a field of view;
a beamformer configured to beamform the echo signal by focusing the echo signal at a depth of interest in a lateral direction and produce a single directional signal at the depth, where the directional signal is transverse to the propagation direction of the ultrasound signal; and
a velocity processor configured to transform the directional signal to produce a corresponding quadrature signal, estimate a depth velocity component and a transverse velocity component at the depth based on the directional signal and the quadrature signal, and generate a signal indicative of the estimate.

2. The system of claim 1, wherein the velocity processor performs a Hilbert transform of the directional signal to produce the quadrature signal.

3. The system of claim 1, wherein the beamformer produces a different single directional signal for each of a plurality of depths of interest along the propagation direction.

4. The system of claim 3, wherein the velocity processor produces a corresponding quadrature signal at each depth from the directional signal at the corresponding depth, and estimates a corresponding depth velocity component and a transverse velocity component for each depth based on the corresponding directional and the quadrature signals.

5. The system of claim 3, wherein the velocity processor determines a lateral wavelength for the directional signal at the depth and estimates the depth velocity component and the transverse velocity component for the depth based on the determined lateral wavelength.

6. The system of claim 3, wherein the beamformer does not beamform a pair of quarter wavelength phased shifted samples for the depth.

7. The system of claim 3, wherein the velocity processor does not focus the directional signal along a flow of the flowing structure.

8. The system of claim 1, wherein the beamformer further generates data for generating an image, and further comprising: an image processor that generates an image based on the data generated by the beamformer.

9. The system of claim 1, wherein the beamforming includes applying an apodization profile to the echo signal, the apodization function includes only two waveforms separated by a non-zero distance, and each of the two waveforms includes apodization values as a function of a transducer element number of the plurality of transducer elements of the transducer array.

10. The system of claim 1, where the velocity processor further determines a velocity spectrum in the transverse direction, determines a fourth order estimate therefrom, and determines a power density spectrum from the fourth order estimate.

11. The system of claim 1, where the velocity processor determines a velocity angle from the directional signals, the beamformer beamforms a second set of signals with the velocity angle in a direction of the flowing structure, and the velocity processor estimates the depth velocity component and the transverse velocity component at the depth based on the second set of signals.

12. The system of claim 1, wherein the transducer array includes a 2D array of transducer elements, and the beamformer beamforms in two orthogonal planes, wherein five lines are beamformed in parallel, and the velocity processor estimates all three velocity components based on the beamformed lines.

13. A method, comprising:
receiving echo signals at a transducer array that produces receive signals indicative thereof;
beamforming the received signals by focusing the received signals at a plurality of depths of interest in a lateral direction to produce a single transverse signal at each of the plurality of depths, wherein each single transverse signal is transverse to a propagation direction of a transmitted ultrasound signal;
transforming, with a processor, the transverse signals for each of the plurality of depths into transformed signals at each of the plurality of depths; and
estimating, with the processor, velocity components for a depth direction and a transverse direction at each of the depths with the transverse signals and the transformed signals.

14. The method of claim 13, further comprising:
performing a Hilbert transform of the transverse signals to produce the transformed signals.

15. The method of claim 13, further comprising:
determining a wavelength for the transverse signal at each depth; and
estimating the velocity components at each depth using a corresponding determined wavelength.

16. The method of claim 13, further comprising:
generating an image, and presenting the image and the estimated velocity components.

17. A non-transitory computer readable storage medium encoded with computer readable instructions, which, when executed by a processor of a computing system, causes the processor to:
generate a single transverse signal from an echo signal at a predetermined depth of interest by focusing the echo signal at the predetermined depth of interest in a lateral direction, wherein the single transverse signal is transverse to a direction of a propagating ultrasound signal;
generate a quadrature signal from the single transverse signal; and
estimate a velocity component from the single transverse signal and the quadrature signal.

18. The non-transitory computer readable storage medium of claim 17, wherein the executed computer readable instructions further cause the processor to:
generate the quadrature signal from a Hilbert transform of the single transverse signal.

19. The non-transitory computer readable storage medium of claim 17, wherein the executed computer readable instructions further cause the processor to:
determine a lateral wavelength for the single transverse signal; and
estimate the velocity component using the lateral wavelength.

20. The non-transitory computer readable storage medium of claim 17, wherein the executed computer readable instructions further cause the processor to:
generate an image, and display the image concurrently with the estimated velocity component.

* * * * *